United States Patent [19]

Kaneyuki

[11] Patent Number: 4,894,570
[45] Date of Patent: Jan. 16, 1990

[54] COMPACT UNITARY STARTING MOTOR AND CHARGING GENERATOR WITH RECESSED CLUTCH

[75] Inventor: Kazutoshi Kaneyuki, Hyogo, Japan

[73] Assignee: Mitsubishi Denki Kabushiki Kaisha, Tokyo, Japan

[21] Appl. No.: 265,867

[22] PCT Filed: Feb. 9, 1988

[86] PCT No.: PCT/JP88/00126
§ 371 Date: Oct. 6, 1988
§ 102(e) Date: Oct. 6, 1988

[87] PCT Pub. No.: WO88/06369
PCT Pub. Date: Aug. 25, 1988

[30] Foreign Application Priority Data

Feb. 12, 1987 [JP] Japan .................... 62-19110

[51] Int. Cl.⁴ .................... H02K 21/16; H02K 16/04
[52] U.S. Cl. .................... 310/113; 74/7 C; 123/179 M; 192/89 B; 310/68 D; 310/78
[58] Field of Search .................... 74/6, 7, 7C, 8, 9; 192/89 B; 123/179 M; 290/38 R, 48; 310/68 D, 74, 78, 153, 261, 263, 268, 112, 113

[56] References Cited

U.S. PATENT DOCUMENTS

| | | | |
|---|---|---|---|
| 4,654,551 | 3/1987 | Farr | 310/112 |
| 4,655,333 | 4/1987 | Martinez-Corral | 192/89 B |
| 4,699,097 | 10/1987 | Tanaka et al. | 123/179 M |
| 4,797,590 | 1/1989 | Raad et al. | 310/68 D |

FOREIGN PATENT DOCUMENTS

| | | | |
|---|---|---|---|
| 61-204247 | 10/1985 | Japan | 310/153 |
| 54949 | 11/1986 | Japan . | |

Primary Examiner—Patrick R. Salce
Assistant Examiner—D. L. Rebsch
Attorney, Agent, or Firm—Sughrue, Mion, Zinn, Macpeak and Seas

[57] ABSTRACT

In an engine starting and charging device mounted between an engine body and a clutch, major parts of the clutch 16 are disposed in a recess 25 formed in the axial direction in the end of the revolving-field pole 102a on the clutch side, to decrease the axial length from the engine to the clutch.

2 Claims, 2 Drawing Sheets

COMPACT UNITARY STARTING MOTOR AND CHARGING GENERATOR WITH RECESSED CLUTCH

FIELD OF THE INVENTION

The present invention relates to a starting motor for starting an engine and a charging generator driven by the engine to charge a battery formed as a unit.

BACKGROUND OF THE INVENTION

An engine starting and charging device including a starting motor and a charging generator as one unit has been suggested as a prior art, for example, as disclosed in Laid-Open Japanese Patent No. Sho 61-54949.

FIG. 1 is a sectional view of a prior-art engine starting and charging device disclosed in Laid-Open Japanese Patent No. Sho 61-54949. In FIG. 1, a starting and charging device body 1 comprises revolving field poles 2a, 2b, a field coil 3, an armature core 4, an armature coil 5, and a crank angle detector 6 as major components.

The revolving field poles 2a, 2b are a pair of comb-shaped field poles produced of a ferromagnetic material, which are coupled as a unit through a ring 7 of a non-magnetic material such that their magnetic pole sections are arranged alternately in the circumferential direction. The field pole 2a, functioning as a flywheel and also as a clutch carrier described later, is mounted on an engine crankshaft 8, and fixed on the end of the crankshaft 8 by a bolt 9. Numeral 10 is a cutout formed at the side section of the field pole 2a, which, combined with the crank angle detector 6, is used to detect the crank angle; the same number of cutouts as the number of magnetic poles of the field pole 2a are provided at equal intervals around the circumference. The width of the cutout 10 in the circumferential direction makes an angle equal to about one half of 360 degrees divided by the number of the cutouts.

The field coil 3, which is for exciting the field poles 2a, 2b, is mounted on the field core 11. This field core 11 is mounted and fixed to a bracket 12 by bolts, which are not illustrated, facing the field poles 2a, 2b, across slight air gaps a, b in the radial direction.

The armature core 4 is formed by laminating silicon steel sheets, within the inner periphery of which are provided a number of slots for setting the armature coil 5 therein, the armature coil 5 being of a three-phase distributed winding type as a common commutatorless brushless motor. The armature core 4 is properly positioned and fixed in relation to the bracket 12, which is secured by bolts 15 to an engine body 13 together with a housing 14 for securing the armature core 4.

The crank angle detector 6 functions as a signal source that operates an armature current switching circuit which is not illustrated, and uses an oscillation-type proximity switch. This proximity switch is so mounted on the bracket 12 that its detecting element faces on the circumferential line where the cutouts 10 of the field pole 2a are provided, and its oscillating conditions vary with the change of inductance at the cutout and non-cutout sections of the field pole 2a, outputting a binary signal "1" and "0" corresponding to the crank angle (field pole position). When a three-phase armature coil 5 is employed, there will be installed three crank angle detectors 6.

Clutch 16 interrupts the transmission of power between the crankshaft 8 and a transmission drive shaft 17, and uses a diaphragm spring clutch comprising a clutch disc 18, a pressure plate 19, a diaphragm spring (disc spring) 20, wire rings 21, 22, and a clutch cover 23. The clutch cover 23 is mounted by bolts 24 to the field pole 2a.

The clutch 16, as is well known, is of such a constitution that when a clutch pedal (not illustrated) is not depressed, the tension of the diaphragm spring 20 is exerted, by leverage, to the clutch disc 18 mounted on the transmission drive shaft 17 through the pressure plate 19, pressing this clutch disc 18 against the side of the field pole 2a to connect the clutch.

When the clutch pedal is depressed, a sleeve, which is not illustrated, slides in the axial direction, pressing the central part of the diaphragm spring 20 in the direction of the arrow C. Therefore the diaphragm spring 20 deflects back on the wire rings 21, 22 as a fulcrum, thus removing a pressure that has been exerted to the clutch disc 18 to disconnect the clutch, and accordingly shutting off the transmission of power from the crankshaft 8 to the transmission drive shaft 17.

In operation, when the key switch, which is not illustrated, is turned to the START position, with the engine left stationary, the current flows into the field coil 3 and the armature coil 5, thereby producing a torque at the field poles 2a, 2b to turn the crankshaft 8 directly coupled. When the field poles 2a, 2b have started turning, the crank angle detector 6 detects the positions of the field poles, and the armature current switching circuit switches the current to the armature coil 5 so that the speed of a rotating field formed by the armature coil 5 will be the same as the speed of rotation of the field poles; accordingly the field poles 2a, 2b will gain a torque for further acceleration. The device, thus producing a starting torque by such a positive feedback operation, starts the engine.

After the engine has started, the speed of rotation of the field poles further increases, thus increasing a back electromotive force produced at the armature coil 5; accordingly no unnecessary starting current will flow.

Furthermore, when, after the starting of the engine, the key switch is placed in the IGNITION position, the starting and charging device body 1 operates as an a.c. synchronous generator, which produces the electric power. The electric power thus produced is converted into d.c. power by means of a rectifier which is not illustrated, and supplied to the battery and electrical equipment mounted on the motor vehicle.

As described above, the prior-art starting and charging device body 1 is disposed between the engine body 13 and the clutch 16. However, since the engine crankshaft 8 and the transmission drive shaft 17 are usually disposed in series, the engine becomes longer in the axial direction than in the radial direction; particularly in an automobile mounted with a horizontal engine which has little dimensional room in the axial length, it is difficult to mount the starting and charging device between the engine body 13 and the clutch 16.

In the case of an engine equipped with a special starting motor and a charging generator, these equipment are mounted in parallel in relation to the engine body. Therefore, there is such a problem that the application of the aforementioned prior-art starting and charging device to such an engine requires a substantial modification in the arrangement of various parts of the engine.

SUMMARY OF THE INVENTION

The present invention has been accomplished in an attempt to solve the above-mentioned problems, and has an object to provide an engine starting and charging device which enables the reduction of size in the axial direction of the engine equipped with a starting and charging device, so that the device may easily be applied to motor vehicles that are restricted by dimensions.

The engine starting and charging device pertaining to the present invention has at least a clutch disc and a pressure plate of clutch set in a recess defined in the axial direction of the revolving-field poles.

In the present invention, because major component members of the clutch are disposed in the recess of the revolving-field poles, the length in the axial direction from the starting and charging device to the clutch can be reduced.

BEST MODE OF THE INVENTION

Figure 2:
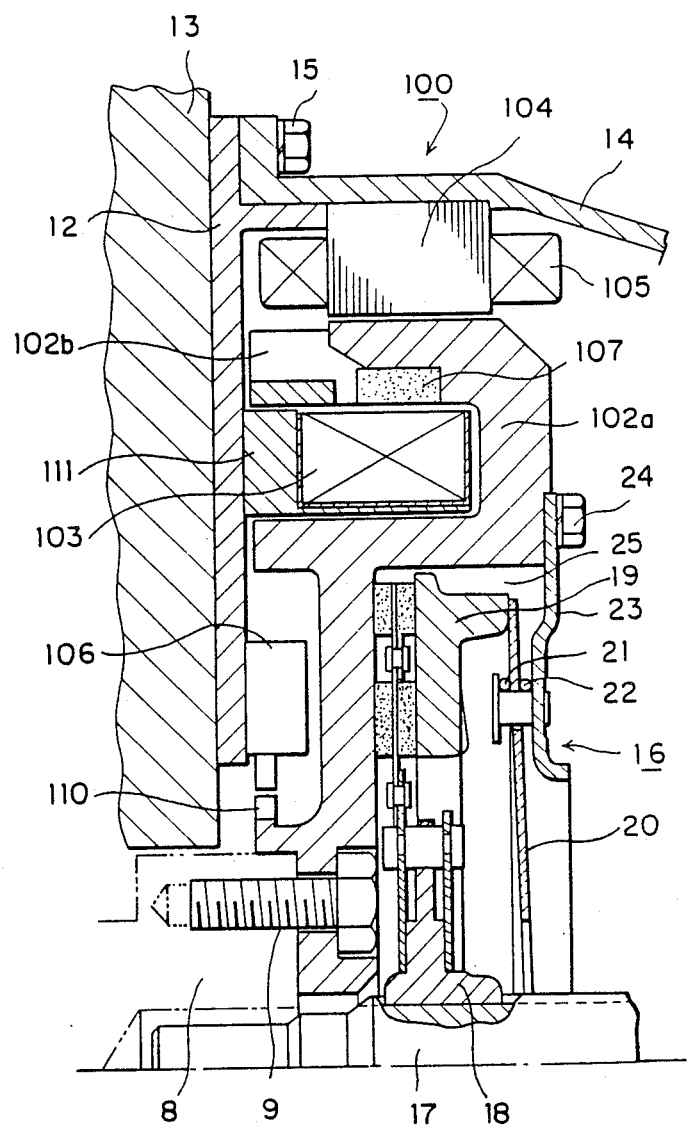
FIG. 2 a sectional view showing a starting and charging device of engine according to one embodiment of the present invention.

A preferred embodiment of the present invention will now be described by referring to the accompanying drawings. FIG. 2 is a sectional view of the starting and charging device of engine in accordance with one embodiment of the present invention. In FIG. 2, numeral 100 is a starting and charging device body, which is made of such major components as a revolving-field poles 102a, 102b, a field coil 103, a field core 111, an armature core 104, an armature coil 105, and a crank angle detector 106. These components correspond to those of the pin art device.

Figure 1:
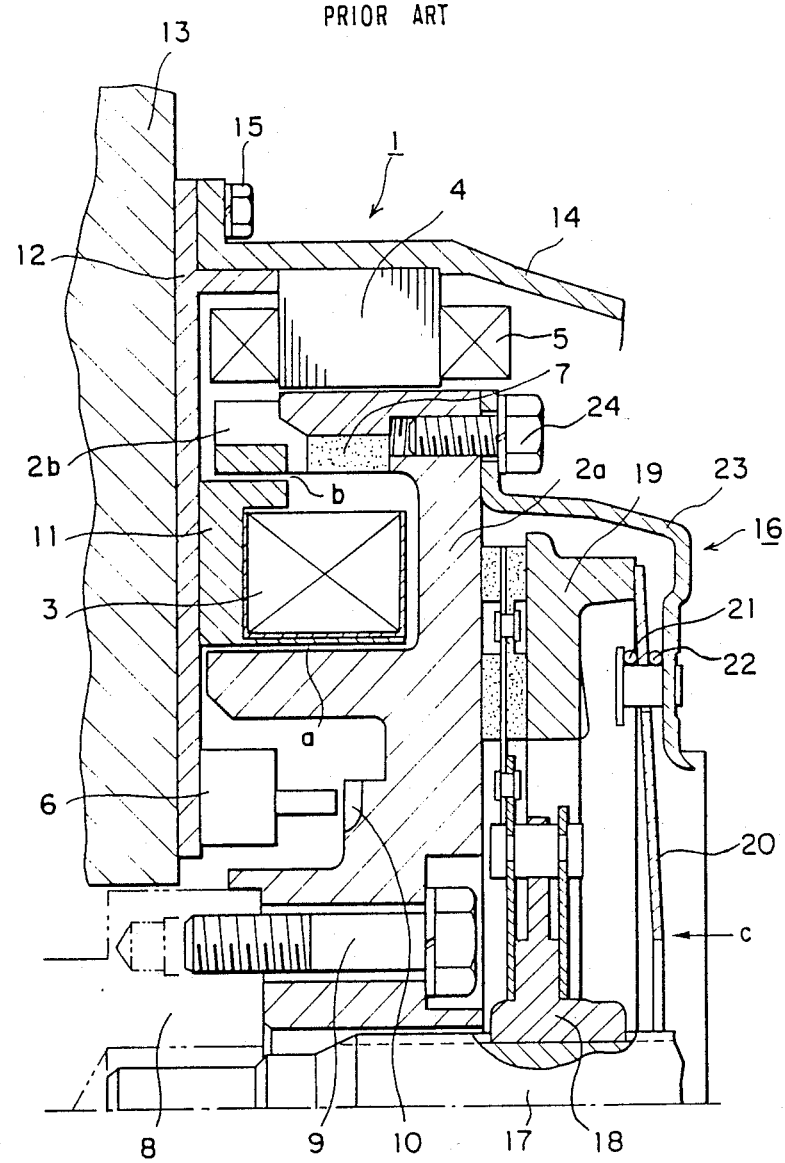
FIG. 1 is a sectional view of a prior-art starting and char device of engine.

The revolving-field pole 102a has a recess 25 formed in the axial direction in the own end on the clutch 16 side. In this recess 25 is disposed the clutch 16. The constitution of this clutch 16 and of aforementioned other components are similar to those of the prior-art device of FIG. 1, and therefore the same numerals are attached to corresponding parts, the explanation of which, therefore, will be omitted.

In such an engine starting and charging device, since the clutch 16 is disposed within a recess 25 of the revolving-field pole 102a, the axial length of only the starting and charging device body 100 is enough for holding both the starting and charging device body and the clutch 16. That is, because of the parallel arrangement of the starting and charging device 100 and the clutch 16 in relation to the crankshaft 8, it is possible to reduce the length of these devices in the axial direction.

Engine starting, battery charge, and clutch 16 operation, being identical to those of the prior art, will not be described herein.

According to the above-mentioned embodiment, the entire body of the clutch 16 is set in the recess 25 of the revolving-field pole 102a, particularly its major parts, such as the clutch disc 18 and the pressure plate 19.

The size in the axial direction of the engine can be further decreased by mounting the crank angle detector 106 which detects the angle of rotation of the revolving-field pole 102a on the bracket 12 corresponding to the recess of the revolving-field poles such that the amount of projection in the axial direction of the crankshaft is decreased and by forming a recess in the end of the revolving-field poles in the axial direction on the clutch side.

What is claimed is:

1. A unitary engine starting motor and charging generator device including a plurality of revolving-field poles (102a, 102b) mounted on a crankshaft (8) of an engine and serving as a carrier for a clutch (16) operably coupled between said crankshaft and a transmission drive shaft (17), field coils (103) for exciting said revolving-field poles, an armature core (104) secured on an engine body (13), and an armature coil (105) wound thereabout, characterized in that a first annular recess (25) is formed in the axial direction in an end of said revolving-field poles on a clutch side thereof, a clutch disc (18) which contacts said revolving-field poles, a pressure plate (19) which presses said clutch disc toward the revolving-field poles, and a disc-shaped clutch spring (20) are disposed fully within said recess to attendantly reduce the overall axial length of the device, a second annular, axial recess is formed in an opposite end of said revolving field poles on a crankshaft side thereof, and an elongate crank angle detector (106) is disposed within said second recess in a radial orientation to further reduce the axial length of the device, and wherein said motor and generator are commutatorless.

2. A device as claimed in claim 1, further comprising a field core (111) mounting said field coils and secured on a bracket (12), and wherein said armature core is secured on a housing (14), said bracket and housing being attached to the engine body by common bolts (15).

* * * * *